(12) United States Patent
Renggli et al.

(10) Patent No.: US 10,100,664 B2
(45) Date of Patent: Oct. 16, 2018

(54) CERAMIC CENTERBODY AND METHOD OF MAKING

(71) Applicant: GENERAL ELECTRIC COMPANY, Schenectady, NY (US)

(72) Inventors: Bernard James Renggli, Cincinnati, OH (US); Jeffrey Franklin Miller, Goshen, OH (US)

(73) Assignee: General Electric Company, Schenectady, NY (US)

( * ) Notice: Subject to any disclaimer, the term of this patent is extended or adjusted under 35 U.S.C. 154(b) by 628 days.

(21) Appl. No.: 14/416,073

(22) PCT Filed: Jul. 19, 2013

(86) PCT No.: PCT/US2013/051201
§ 371 (c)(1),
(2) Date: Jan. 21, 2015

(87) PCT Pub. No.: WO2014/058502
PCT Pub. Date: Apr. 17, 2014

(65) Prior Publication Data
US 2015/0226083 A1 Aug. 13, 2015

Related U.S. Application Data

(60) Provisional application No. 61/677,533, filed on Jul. 31, 2012.

(51) Int. Cl.
*F01D 25/00* (2006.01)
*B32B 18/00* (2006.01)
(Continued)

(52) U.S. Cl.
CPC ............ *F01D 25/005* (2013.01); *B32B 18/00* (2013.01); *C04B 35/18* (2013.01); *C04B 35/803* (2013.01);
(Continued)

(58) Field of Classification Search
CPC ........ F01D 25/005; F01D 25/24; B32B 18/00; Y10T 29/4932
(Continued)

(56) References Cited

U.S. PATENT DOCUMENTS 5,249,877 A * 10/1993 Corsmeier ............ F01D 25/246
403/24
5,251,435 A  10/1993 Pauley
(Continued)

FOREIGN PATENT DOCUMENTS

CN    1854611 A    11/2006
CN    1948718 A    4/2007
(Continued)

OTHER PUBLICATIONS

Japanese Search Report issued in connection with corresponding JP Application No. 2015-525449 dated Apr. 26, 2017.
(Continued)

*Primary Examiner* — Vincent Tatesure
(74) *Attorney, Agent, or Firm* — General Electric Company; Brain Overbeck

(57) ABSTRACT

A ceramic centerbody (120) for an aircraft gas turbine engine. The ceramic centerbody (120) comprises an interlaced fiber structure having fibers oriented in a substantially transverse directions and a ceramic matrix surrounding the ceramic fiber structure. The ceramic fiber and matrix are formed into a conical shape having a fore end (128) and an aft end (126). The centerbody includes a means for mechanical attachment (130) circumferentially oriented around the fore end of the centerbody. The fore end further includes additional plies oriented in a third preselected direction, thereby providing additional strength to for mechanical attachment.

12 Claims, 3 Drawing Sheets

(51) Int. Cl.
   C04B 35/18   (2006.01)
   C04B 35/80   (2006.01)
   F02K 1/04    (2006.01)
   F01D 25/24   (2006.01)
   F02C 3/10    (2006.01)
   F02C 7/20    (2006.01)

(52) U.S. Cl.
   CPC .............. *F01D 25/24* (2013.01); *F02C 3/10* (2013.01); *F02C 7/20* (2013.01); *F02K 1/04* (2013.01); *C04B 2235/5224* (2013.01); *C04B 2235/5228* (2013.01); *C04B 2235/5268* (2013.01); *C04B 2237/341* (2013.01); *C04B 2237/38* (2013.01); *F05D 2300/6033* (2013.01); *F05D 2300/614* (2013.01); *Y02T 50/672* (2013.01); *Y10T 29/4932* (2015.01)

(58) Field of Classification Search
   USPC ......................................................... 442/59
   See application file for complete search history.

(56) References Cited

U.S. PATENT DOCUMENTS

| | | | |
|---|---|---|---|
| 5,376,598 | A | 12/1994 | Preedy et al. |
| 7,377,742 | B2 | 5/2008 | Shapiro et al. |
| 7,647,779 | B2 | 1/2010 | Shi et al. |
| 8,262,345 | B2 | 9/2012 | Andrew |
| 2003/0207155 | A1 | 11/2003 | Morrison et al. |
| 2004/0123599 | A1* | 7/2004 | Ackermann ............ F01D 5/288 60/770 |
| 2005/0186069 | A1 | 8/2005 | Subramanian et al. |
| 2010/0205930 | A1 | 8/2010 | Conete et al. |
| 2011/0111211 | A1 | 5/2011 | Golecki |
| 2011/0203255 | A1 | 8/2011 | Conete |

FOREIGN PATENT DOCUMENTS

| | | |
|---|---|---|
| CN | 101839152 A | 9/2010 |
| JP | 2002-104881 A | 4/2002 |
| JP | 2003-214186 A | 7/2003 |
| JP | 2008-514848 A | 5/2008 |
| JP | 2010-518313 A | 5/2010 |
| JP | 2010-215459 A | 9/2010 |
| JP | 2011-501707 A | 1/2011 |
| JP | 2011-518288 A | 6/2011 |
| JP | 2011-527957 A | 11/2011 |
| WO | 2012022344 A1 | 2/2014 |

OTHER PUBLICATIONS

Notification of Reasons for Refusal issued in connection with corresponding JP Application No. 2015-525449 dated May 9, 2017.
Unofficial English translation of Office Action issued in connection with corresponding CN Application No. 201380040646.6 dated Sep. 6, 2015.
Schmucker et. al.: "Mesostructure of WHIPOX all oxide CMC's", Composites Part A: Applied Science and Manufacturing, Elsevier Science Publishers B.V., Amsterdam, NL, vol. 34, No. 7, Jul. 1, 2003; pp. 613-622.
PCT Invitation to Pay Additional Fees issued in connection with corresponding PCT Application No. PCT/US13/051201 dated Apr. 4, 2014.
PCT Search Report & Written Opinion issued in connection with corresponding PCT Application No. PCT/US13/051201 dated May 20, 2014.
PCT IPRP issued in connection with corresponding PCT Application No. PCT/US13/051201 dated Feb. 12, 2015.

* cited by examiner

CERAMIC CENTERBODY AND METHOD OF MAKING

CROSS-REFERENCE TO RELATED APPLICATIONS

This application claims the benefit of prior filed provisional U.S. Patent Application 61/677,533 filed Jul. 31, 2012.

FIELD OF THE INVENTION

The present invention is directed to the field of gas turbine engines and specifically to use of ceramic matrix composites for centerbodies to reduce weight in aircraft gas turbine engines.

BACKGROUND OF THE INVENTION

Generally, gas turbine engines operate by burning fuel and extracting energy from the combusted fuel to generate power. Atmospheric air is drawn into the engine from the environment, where it is compressed in multiple stages to significantly higher pressures operating at higher temperatures. The compression is accomplished in the compressor section of the engine. An optional fan section may be located before or in front of the compressor section, that is, fore of the compressor section in certain engines. In addition, the fan section may have multiple stages. A portion of the compressed air is then mixed with fuel and ignited in the combustor to produce high energy combustion gases. The high energy combustion gases then flow through the turbine section of the engine, which includes a plurality of turbine stages, each stage comprising turbine vanes and turbine blades mounted on a rotor. The high energy combustion gases create a harsh environment, causing oxidation, erosion and corrosion of downstream hardware. The turbine blades extract energy from the high energy combustion gases and turn the turbine shaft on which the rotor is mounted. The turbine shaft rotation also results in rotation of the compressor section and the fan section, which sections may be directly mounted on the turbine shaft, or more likely, connected to the turbine shaft with gearing and/or auxiliary shafts. The turbine section also may directly generate electricity. A portion of the compressed air is also used to cool components of the turbine engine downstream of the compressor, such as combustor components, turbine components and exhaust components.

Aircraft gas turbine engines are a subclass of gas turbine engines. These engines generally are operated using jet fuel. Furthermore, the exhaust gases passing through the turbine section are used to propel the aircraft. In addition, one of the long sought after goals for aircraft gas turbines is improved operating efficiency, which can be accomplished by weight reduction of the aircraft engine itself and by increasing the temperature capabilities of the turbine itself, so that additional energy can be extracted from the combustion process.

Weight reductions in aircraft turbine engines are a source of improved operating efficiencies. One area of improved operating efficiency is the use of lighter weight materials in the engine, in particular, regions aft of the hot section of the engine. These areas have posed not only the greatest opportunities but also the greatest challenges. Such opportunities are available in the hot section of the engine because the hot section of the engine substantially comprises metals, such as superalloys, that tend to have a high density as compared to non-metallic materials. The hot section components aft of the compressor furthermore can be relatively large and therefore relatively heavy. However, superalloys are utilized for these hot section components because they provide the unique combination of mechanical properties at high temperatures as well as corrosion resistance, oxidation resistance and erosion resistance.

Any reduction in weight resulting from substitution of lighter weight material for metallic hot section components is desirable. However, the substitution of materials in a hot section engine component must not adversely affect the engineering performance of the hot section component. The component must at least maintain its mechanical properties at high temperatures while also providing corrosion resistance, oxidation resistance and erosion resistance.

BRIEF DESCRIPTION OF THE INVENTION

A ceramic matrix composite (CMC) centerbody for an aircraft gas turbine engine is set forth herein. The ceramic centerbody comprises an interlaced ceramic fiber structure having fibers interlaced in substantially transverse directions, and a ceramic matrix surrounding the interlaced fiber structure. The ceramic fiber and matrix are formed into a conical shape having a fore end and an aft end. The centerbody includes a means for mechanical attachment to the fore portion of the engine, the attachment circumferentially oriented around the fore end of the centerbody at a circumferential interface with the fore portion of the engine. The fore end of the centerbody further may include additional plies of CMC material oriented in a third preselected direction, thereby providing additional strength for mechanical attachment.

The centerbody has temperature capabilities in excess of the normal operating temperature of the aircraft gas turbine exhaust where it is located. Because the centerbody is a ceramic matrix composite material that is sintered, it is not subject to further oxidation. The CMC composite has sufficient thickness so that the hot exhaust gases passing over its exterior surface do not erode the CMC centerbody significantly over the life of the engine.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
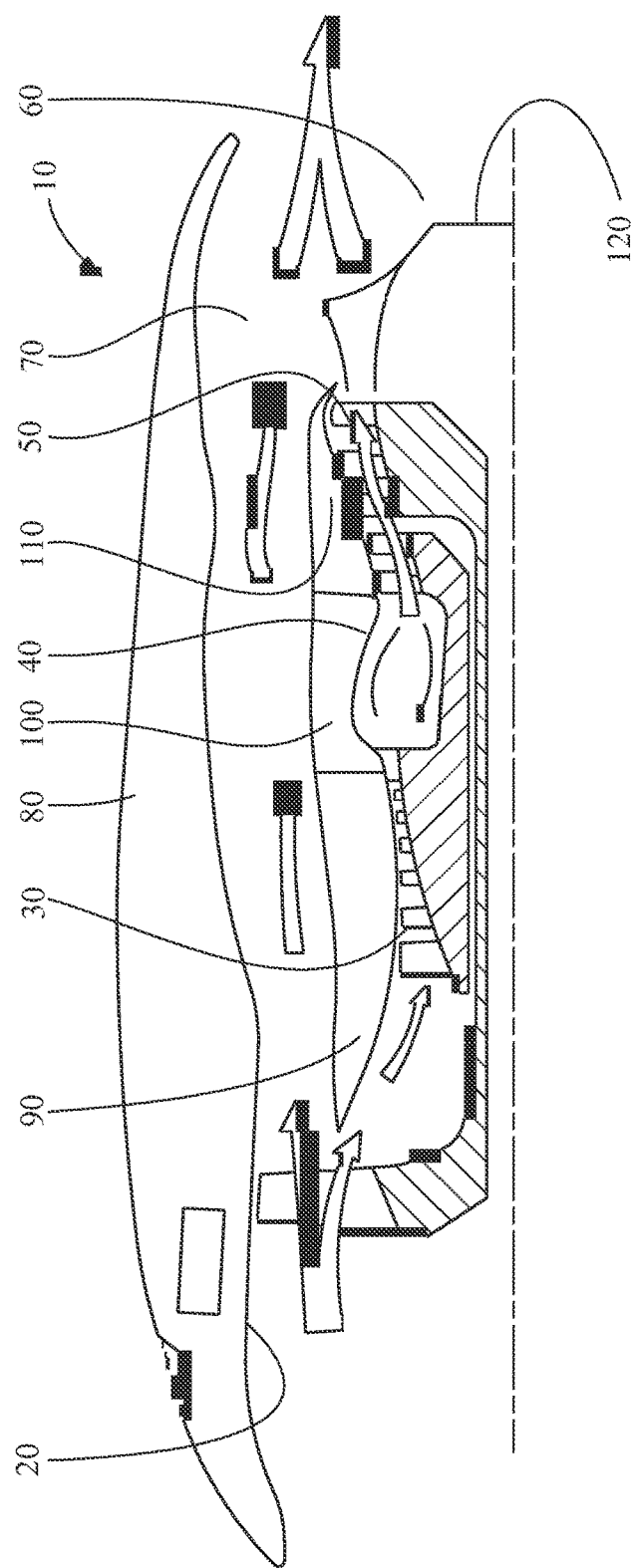
FIG. 1 provides a cross-section of a typical high bypass gas turbine engine used in aircraft engine applications.

FIG. 1 depicts a partial cross-sectional view of a high bypass gas turbine engine 10. The cross-sectional view displays a multi-stage fan section 20 in the fore portion of the engine. Behind or aft of multi-stage fan section 20 is compressor section 30. Air drawn in through fan section 20 flows into compressor section 30 where it is compressed. A portion of the air drawn through fan section 20 passes around compressor section 30, such air referred to as bypass air. A substantial portion of compressed air from compressor section 30 enters combustor section 40 where it is used to ignite fuel in a plurality of combustors. A portion of compressed air from compressor section 30 also may be used for active or passive cooling of hot section components, cabin compression, cabin air supply and other purposes.

Hot gases of combustion passing from combustor section 40 flow through turbine section 50, which may comprise one or more turbine stages. The turbine section comprises a high pressure turbine (HP) at a fore end adjacent to combustor portion 40 and a low pressure (LP) turbine at an aft end adjacent to the exhaust. The turbine section 50 extracts energy from the hot gases of combustion to turn fan section 20, combustor section 40 and provide power for auxiliary aircraft functions such as electricity for the cockpit, instrumentation and cabin. Exhaust gases after passing through the turbine section 50 pass over centerbody 120 and into the exhaust section 60, where the exhaust gases mix with bypass air from fan section 20 to provide thrust to propel the aircraft. Bypass air from the fan passes through a duct 70 formed between engine casing 80 comprising an exterior wall of the duct and casings 90, 100, 110 of compressor, combustor and turbine sections comprising an interior wall duct 70.

Figure 2:
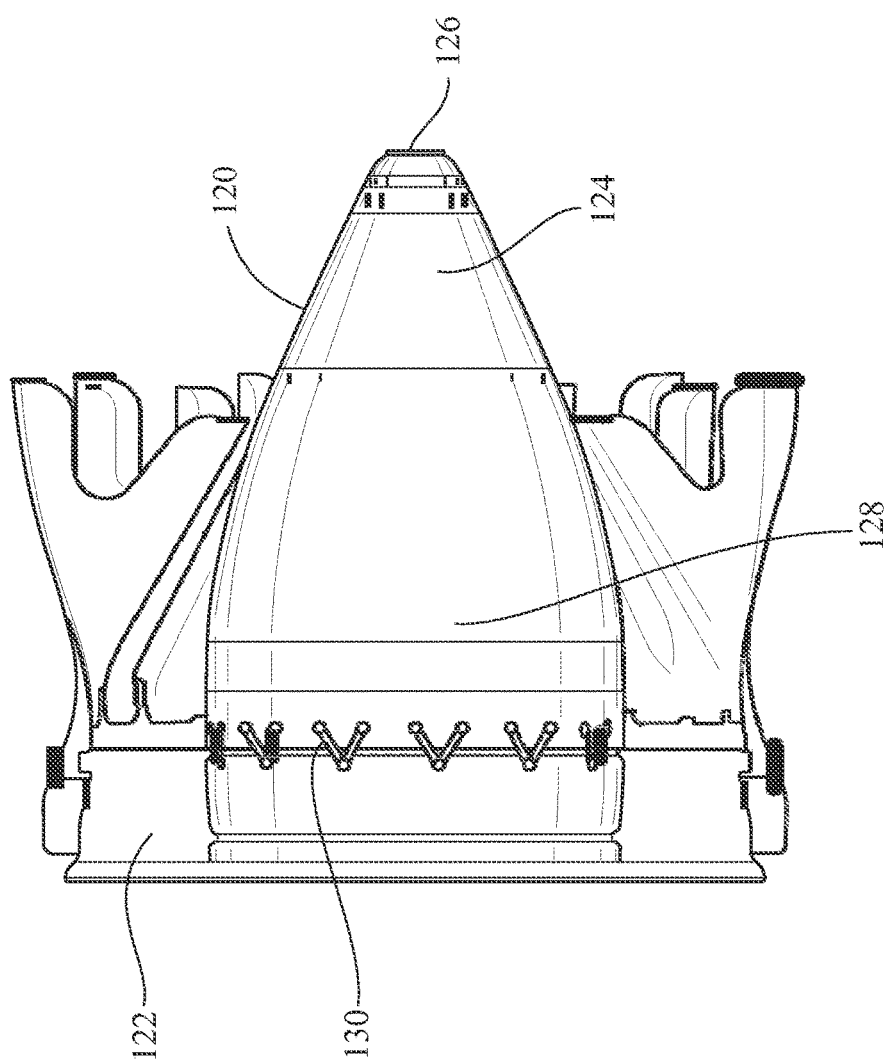
FIG. 2 depicts a side view of a rear centerbody of an aircraft engine.

FIG. 2 depicts a side view of a rear centerbody 120 of an aircraft engine 10. Exhaust gas flows from turbine section 50 and over centerbody 120 where it mixes with bypass air from duct 70 in exhaust section. As discussed with reference to FIG. 1. In commercial aircraft engines 10, centerbody 120 is comprised of metal. Centerbody as shown in FIG. 2 is conically shaped and usually is hollow. Because the fast moving hot exhaust gases can cause oxidation and erosion, centerbody is typically a material that resists oxidation, erosion and corrosion. As can be seen from FIGS. 1 and 2, the hollow centerbody is a substantially large shaped component, which, as a metallic component such a nickel-based alloy, a cobalt-based alloy or a nickel-cobalt-based alloy, can be heavy.

The present invention utilizes a centerbody 120 comprising a ceramic matrix composite material. Functionally, the ceramic matrix composite material utilized for centerbody 120 must be capable of surviving for sustained periods of time experiencing exhaust temperatures of about 1800° F. It must also survive a flow of hot gases of combustion over its outer surface which may cause erosion. While the ceramic matrix composite material may be comprised of any combination of ceramic fibers in a ceramic matrix, the preferred materials include polycrystalline α-alumina fibers with silica additions, in an aluminosilicate matrix. The preferred fiber matrix combination provides outstanding creep resistance. Any aluminosilicate matrix material may be used for the matrix and coupled with the ceramic fibers. While this describes the preferred material combination, any other combination of ceramic material fibers in a ceramic matrix may be used. The invention is not restricted to aluminosilicate fibers and aluminosilicate matrices, as any combination of ceramic fibers in a ceramic matrix that can survive the exhaust atmosphere of a gas turbine engine while maintaining mechanical properties may be used.

The CMC centerbody attaches to a metal rear frame 122 of the low pressure turbine. There is a significant difference in coefficient of thermal expansion (CTE) between metal rear frame 122 of the low pressure turbine and CMC centerbody 120, which may lead to a mismatch due to the different rates of expansion. While a mechanical attachment may be used to attach centerbody 120 to rear frame 122, the mechanical attachment must be sufficiently flexible to account for the difference in thermal expansion in the radial direction between CMC centerbody 120 and metal frame 122. While any mechanical connection may be used, the Y-brackets provide restraint in the tangential direction while allowing for kinematic growth in the radial direction.

Figure 4:
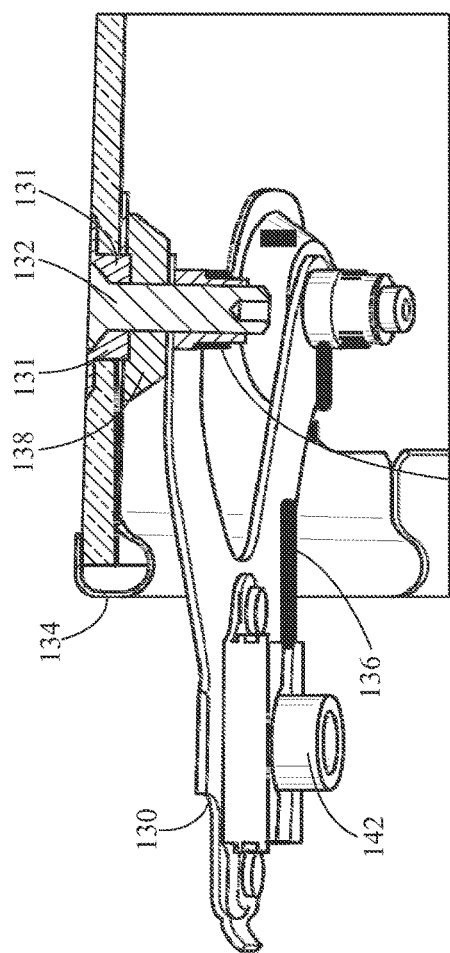
FIG. 4 is detail view of a Y-bracket assembly attached to a CMC centerbody.
Figure 3:
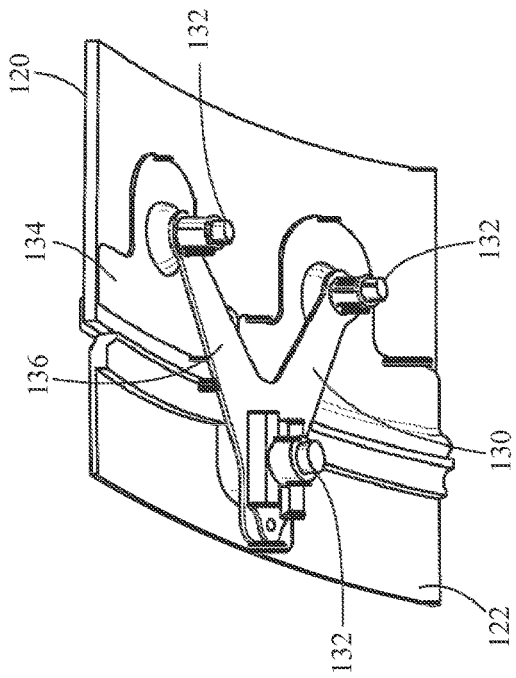
FIG. 3 is a perspective view showing a Y-bracket assembly attaching the engine rear frame to a CMC centerbody.

FIGS. 3 and 4 illustrate a preferred mechanical connection for attaching CMC centerbody 120 to metal frame 122. A plurality of Y-bracket assemblies 130 extend between metal engine rear frame 122 and CMC centerbody 120 and secure rear frame 122 to centerbody 120 while providing the ability for kinematic growth in the radial direction. Fasteners 132 secure Y-bracket assemblies 130 to centerbody 120 and rear frame 122 through a plurality of apertures in centerbody 120 and rear frame 122. Each aperture in centerbody further includes an insert 131 to accept fastener 132, the insert preferably being a high temperature metallic to reduce wear between fastener 132 and centerbody 120.

FIG. 4 better illustrates a Y-bracket assembly 130 attached to CMC centerbody 120. CMC centerbody 120 includes an edge protector 134 assembled over its fore edge to protect centerbody from damage due to metallic expansion of rear frame and vibration contact with metal engine rear frame 122, as CMC centerbody will detrimentally wear. Edge protector 134 which preferably is a high temperature metallic material will prevent contact of rear frame 122 to CMC centerbody 120. In this embodiment. edge protector 134 is also fastened to centerbody 120 with Y-bracket assemblies 130. Each Y-bracket assembly 130 includes arms extending across a surface of centerbody 120, each arm including an aperture for accepting a fastener 132. A spacer 138 is positioned between the CMC centerbody 120 and edge protector 134, when so provided, and each arm 136. A locking device 140 is positioned over each arm 136 to capture each fastener 132 extending through insert, centerbody aperture, spacer, 138, and arm 136 to lock Y-bracket assembly 130 to CMC centerbody 120. Preferably, fastener 132 is a hi-lok pin paired with hi-lok collar. At its opposite end, Y-bracket assembly 130 has another aperture and a nut plate 142 to capture a fastener 132 extending through an aperture in engine rear frame 122, the fastener 132 and nut plate 142 securing engine rear frame to Y-bracket assembly 130.

CMC centerbody 120 is comprised of an interlaced ceramic fiber structure having fibers interlaced in substantially (two) transverse directions. Centerbody 120 is fabricated by dipping the interlaced fiber structure in a slurry of matrix material to form plies and wrapping it around a conical mandrel in the shape of centerbody 120. In the fore end of centerbody 120, the circumference at which the mechanical connection joins centerbody 120 to metal rear frame 122 may be reinforced with additional plies oriented in a preselected third direction, preferably the ±45° direction, to provide additional strength around centerbody 120 in the vicinity of the joint. Also, the aft end 124 of centerbody 120 includes an aperture or opening 126 for manufacturing purposes. Additional strength at this location also may be provided with additional plies, such as plies oriented in the ±45° direction. Because centerbody 120 is not subject to high operating stresses at this location, lay-up is not critical and any acceptable ply lay-up may be used. The only region where there is a concern with stresses is, as discussed, the attachment to metal rear frame 122. Centerbody 120, however, will be subject to stresses from thermal cycling due to differences in CTE between it and metallic rear frame 122. It also must withstand erosion and be resistant to oxidation due to the flow of hot high speed exhaust gases over its surfaces. Corrosion from the hot exhaust gases should not pose a problem for the ceramic matrix composite.

To fabricate the composite center body, a contoured tool having the general shape of the centerbody is provided and plies are laid up on the contoured tool. The tool is slightly undersized to accommodate the thickness of the layup. After the plies have been staged on or in an appropriate contoured tool to form a green preform, the green centerbody is cured by heating it to a temperature of about 350° F. for a time sufficient to cure it, about an hour or less. While this is the preferred temperature for the system set forth above, the curing temperature for this system may vary from 300-400° F., with curing shorter times required for higher temperatures and/or thinner cross sections. Other ceramic systems may require different curing times and temperatures. Centerbody is relatively thin, and is cured by heating it to a temperature of about 350° F. for a time sufficient to cure it. Although curing time may vary, the important functional result is that the green centerbody is cured. Curing may take up to about 5 hours and curing time will be dictated by the actual thickness of the green centerbody.

Centerbodies may have variable thickness from about 0.020 (20 mils) inches to about 0.180 (180 mils) inches depending on engine design, and curing for a preselected thickness may be accomplished as previously noted. Centerbodies are usually thicker in the region or circumference that accommodates mechanical fastening devices. After curing, centerbody 120 may then be removed from the contoured tool and inspected. It is preferred that centerbody 120 be sintered by raising it to a temperature to a range at least equal to the operating temperature it will experience in service without exceeding the thermostability temperature of the fibers used. This temperature range is generally between 1000° F. (537° C.) and 2200° F. (1005° C.). It is further preferred that centerbody 120 be sintered prior to assembling to metal attachment hardware. Sintering may be accomplished in air for a sufficient time to convert the cured centerbody into a ceramic. This may be accomplished by any convenient method. For example, sintering of a cured centerbody 120 may be accomplished by placing it in a furnace at a predetermined sintering temperature for a predetermined amount of time to accomplish full sintering, or by placing it in a furnace and slowly heating to temperature and holding at temperature until sintered, or by utilizing quartz lamps to heat it to sintering temperature and holding at sintering temperature for a predetermined period of time to accomplish full sintering. Any other method for sintering may be used.

The CMC composite, after sintering, preferably has a porous matrix structure, which includes fine microporosity, typically having an average size of 0.1 mils (0.0001") and finer. The porous matrix is an important factor in providing decoupling between the aluminosilicate fibers and the aluminosilicate matrix. The porous matrix prevents crack propagation across the sintered structure when cracks develop. The porous matrix acts as a crack arrestor while providing adequate strength at the fiber/matrix interface to prevent fiber pullout.

Following sintering, the sintered centerbody shell may be trimmed by conventional machining methods. Any machined features, such as holes or apertures required to assemble to attachment hardware, may be added by conventional machining operations. The fore end of centerbody 120 is mechanically fastened to the aft end of engine rear frame. A gap or opening exists between centerbody 120 and engine rear frame. Referring to FIG. 2, a metallic strip 134 may be applied over the fore edge of centerbody 120 to seal the gap. The metallic strip is provided over the fore edge of centerbody 120 to provide erosion protection to the leading edge of the ceramic composite material comprising centerbody 120. The metallic strip also occupies what would otherwise be a gap and provides an aerodynamic interface with the rear frame. The metal strip includes a radial offset from the turbine rear frame to a forward facing step, for smooth aerodynamic flow from the rear frame hardware to the centerbody. The metal strip may be any high temperature alloy that can survive the harsh environmental conditions at the exit of the turbine, which includes oxidation and corrosion resistance. The metal strip preferably may be a stainless steel or a superalloy such as Inconel 718. The metal strip preferably has a thickness of about 5-15 mils (0.005-0.015 inches) and extends over the outer diameter of the centerbody around its fore facing edge to the inner diameter. Metal strip 134 may comprise a plurality of segments, each segment partially extending around the fore circumference of centerbody 120. For example, each of four metal segments of metal strip 120 may extend somewhat greater than 90° around the circumference, the additional extension providing some overlap between the strips. Metal strip is preferably segmented so that on heating and cooling, additional stresses are not transmitted to centerbody, the segments expanding and contracting more readily along their circumference instead of in a radial or diametral direction. Preferably it is mechanically fastened to the centerbody using the same mechanical fasteners that assemble the centerbody to the rear frame, as shown in FIG. 2.

CMC centerbody 120 provides a weight reduction of 4-5 pounds over the prior art metallic superalloy centerbodies, which is a substantial reduction in weight for an aircraft turbine engine. The actual amount of weight reduction will depend upon the size and design of the engine, larger engines generally having larger centerbodies than smaller engines. CMC centerbodies 120 also advantageously provide an improvement in corrosion resistance because they are not subject to corrosion, unlike metallic centerbodies. Furthermore, because CMC centerbodies 120 in a sintered state are already oxidized, oxidation is not a concern. Furthermore, centerbodies 120 are suitable for usage even as exhaust temperatures are increased up to about 1200° C. (about 2200° F.) before active or passive cooling must be provided.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A green ceramic centerbody (120) for an aircraft gas turbine engine, comprising:
    an interlaced fiber structure having fibers oriented in a substantially transverse direction;
    a ceramic matrix surrounding the interlaced fiber structure; and
    wherein the ceramic fibers and ceramic matrix surrounding the fibers are formed into a conical shape having a fore end (128) and an aft end (124), and wherein a plurality of Y-brackets are circumferentially oriented around the fore end to form mechanical attachment and to provide restraint in the tangential direction while allowing for kinematic growth in the radial direction.

2. The ceramic centerbody (120) of claim 1 wherein the fore end (128) further includes additional plies of ceramic material oriented in a third preselected direction.

3. The ceramic centerbody (120) of claim 1 wherein the fibers of the interlaced fiber structure further comprise a first ceramic material and the ceramic matrix comprises a second ceramic material.

4. The ceramic centerbody (120) of claim 1 wherein the fibers of the interlaced fiber structure further comprise aluminosilicate fibers.

5. The ceramic centerbody (120) of claim 4 wherein the aluminosilicate fibers comprise polycrystalline α-alumina fibers.

6. The ceramic centerbody (120) of claim 1 wherein the ceramic matrix comprises aluminosilicate material.

7. The ceramic centerbody (120) of claim 1 wherein the interlaced fiber structure and matrix further comprise at least one ply of ceramic material, the fibers interlaced within the ply oriented in substantially transverse directions and surrounded by the ceramic matrix.

8. The centerbody (120) of claim 1 further including plies of ceramic matrix composite material reinforcing the fore end (128) of the centerbody, the plies oriented in a preselected third direction at an angle between the substantially transverse oriented plies.

9. The centerbody (120) of claim 8 wherein the preselected third direction is an angle oriented at ±45° to the substantially transverse oriented plies.

10. The centerbody (120) of claim 1 further including an aperture (126) at the aft end, the aft end further including reinforcing plies of ceramic matrix composite material, the plies oriented in a preselected third direction at an angle between the substantially transverse oriented plies.

11. The centerbody (120) of claim 1 further including a corrosion resistant, oxidation resistant metallic strip (134) overlying a fore edge of the fore end (128).

12. The centerbody (120) of claim 1 wherein the metallic strip (134) is selected from the group consisting of stainless steel and superalloys.

* * * * *